United States Patent [19]

Yamanaka et al.

[11] 4,407,448
[45] Oct. 4, 1983

[54] TEMPERATURE SENSING VALVE

[75] Inventors: Minoru Yamanaka, Toyota; Mitsuyuki Suzuki, Gamagoori; Hideo Haneda, Toyota; Masatoshi Kato, Kariya; Masataka Ohtsuki, Toyota, all of Japan

[73] Assignee: Aisin Seiki Kabushiki Kaisha, Kariya, Japan

[21] Appl. No.: 297,276

[22] Filed: Aug. 28, 1981

[30] Foreign Application Priority Data

Aug. 29, 1980 [JP] Japan .................................. 55/120102

[51] Int. Cl.³ ............................................. G05D 23/26
[52] U.S. Cl. ...................................... 236/88; 219/495; 335/146
[58] Field of Search ............... 236/88, 93 R; 219/495; 335/208, 146

[56] References Cited

U.S. PATENT DOCUMENTS

| 2,339,087 | 1/1944 | Mantz | 219/495 X |
| 2,678,774 | 5/1954 | Arvin | 236/88 X |
| 2,688,446 | 9/1954 | Wittmann | 236/88 |
| 3,450,342 | 6/1969 | Arledge, Jr. | 236/93 R X |
| 4,247,041 | 1/1981 | Kitamura et al. | 236/87 X |
| 4,303,196 | 12/1981 | Raines | 236/88 |

Primary Examiner—William E. Tapolcai
Attorney, Agent, or Firm—Oblon, Fisher, Spivak, McClelland & Maier

[57] ABSTRACT

A temperature sensing valve includes a casing having an internal fluid passage member formed therein, a permanent magnet mounted in the casing, a valve body which includes a magnetically soft, amorphous metal member supported in a thermally sensitive region of the casing for movement between a first and second position and being magnetically coupled to the permanent magnet so that flow through the fluid passage member can be interrupted in response to magnetic excitement by the permanent magnet of the valve body, and a spring for urging the valve body in a first direction to permit fluid flow through the fluid passage member wherein when the temperature of the second thermally sensitive region is below the Curie point of the second valve body, the valve body is excited by the permanent magnet to maintain the fluid passage member closed against the biasing force of the spring whereas when the temperature of the thermally sensitive region reaches the Curie point of the valve body, the valve body constitutes a paramagnetic body and is no longer excited by the permanent magnet so as to be displaced by the biasing force of the spring to the second position for flow of the fluid through the fluid passage member.

4 Claims, 1 Drawing Figure

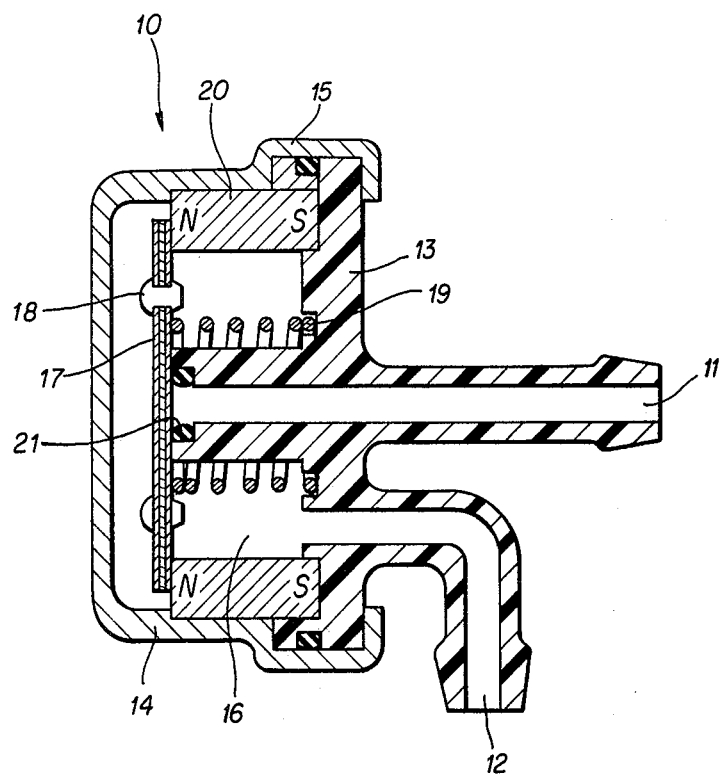

TEMPERATURE SENSING VALVE

BACKGROUND OF THE INVENTION

1. Field of the Invention

The invention relates to a temperature sensing valve which controls flow through a fluid passage in accordance with a temperature being determined.

2. Description of the Prior Art

A conventional arrangement of the type described utilizes the stroke of a bimetal which occurs in response to a temperature change to thereby open or close a valve. However, the reduced magnitude of the stroke of the bimetal results in poor accuracy in the operation of the valve. In addition, the flow rate which can be controlled is limited to a small value.

SUMMARY OF THE INVENTION

It is an object of the present invention to eliminate the above-described disadvantages of the prior art by providing a temperature sensing valve having improved accuracy and assuring positive valve operation in accordance with a temperature being determined by imparting a temperature sensing function and a valve function to a magnetically soft, amorphous metal itself, based on the recognition that such amorphous metal has the property of changing to a paramagnetic body at or above the Curie point thereof.

In accordance with the present invention, a temperature sensing valve is provided which includes a casing having an internal fluid passage member formed therein, a permanent magnet mounted in the casing, a valve body which includes a magnetically soft, amorphous metal member supported in a thermally sensitive region of the casing for movement between a first and second position and being magnetically coupled to the permanent magnet so that flow through the fluid passage member can be interrupted in response to magnetic excitement by the permanent magnet of the valve body and a spring for urging the valve body in a first direction to permit fluid flow through the fluid passage member wherein the temperature of the thermally sensitive region is below the Curie point of the valve body, the valve body being excited by the permanent magnet to maintain the fluid passage member closed against the biasing force of the spring whereas when the temperature of a thermally sensitive region reaches the Curie point of the valve body, the valve body constitutes a paramagnetic body and is no longer excited by the permanent magnet so as to be displaced by the biasing force of the spring to a position for flow of the fluid through the fluid passage member.

BRIEF DESCRIPTION OF THE DRAWING

Various objects, features and attendant advantages of the present invention will be more clearly evident when considered in connection with the accompanying sole drawing wherein:

The sole FIGURE is a cross sectional view of one embodiment of the present invention.

DETAILED DESCRIPTION OF THE PREFERRED EMBODIMENT

One embodiment of the invention will now be described below with reference to the sole FIGURE. A temperature sensing valve is generally shown by reference number 10 and includes a body 13 formed of a synthetic resin material in which an inlet port 11 and an outlet port 12 are formed. A cover 14, formed of brass, for example, is integrally secured to body 13 to define a casing 15 in which a valve chamber 16 is formed which is normally maintained in communication with port 12 and which permits communication to be established between ports 11 and 12. The combination of port 11, valve chamber 16 and port 12 forms a fluid passage. The top surface of cover 14, which is located on the left-hand side as viewed in the sole FIGURE, is exposed to a region the temperature of which is to be determined, thus serving as a temperature sensor.

A valve body 17 including a plurality of sheets of a magnetically soft, amorphous metal disposed in a stack is located inside and adjacent to the temperature sensor region of cover 14 and these sheets are integrally connected together by rivets 18. A spring 19 having one end thereof anchored to body 13 engages valve body 17 at the other end thereof, whereby valve body 17 is urged axially to the left. An annular permanent magnet 20 is secured to body 13 inside casing 15 and is magnetically coupled to valve body 17.

A valve seat 21 is mounted over the left-hand opening of port 11 for abutment with valve body 17 to interrupt communication between port 11 and valve chamber 16. The Curie point of the amorphous metal which forms valve body 17 represents a temperature where switching operation between the open and the closed condition of the valve should occur.

Hence, when the temperature of the temperature sensor region is below the Curie point of the amorphous metal, and the amorphous metal is therefore magnetically excited by permanent magnet 20, valve body 17 is attracted by permanent magnet 20 against the resilience of spring 19 so as to be displaced axially to the right until it abuts against valve seat 21, thus interrupting communication between inlet and the outlet port 11, 12. When the temperature of the temperature sensor region reaches or exceeds the Curie point of the amorphous metal, the amorphous metal characteristically changes to a paramagnetic material and hence valve body 17 is no longer magnetically excited by permanent magnet 20. Accordingly, valve body 17 is urged by spring 19 to move away from valve seat 21, establishing communication between inlet and outlet port 11, 12. A preferably magnetically soft, amorphous metal which is used to construct valve body 17 is a cobalt system. By changing the content of cobalt, a Curie point can be freely established in a range from approximately $-30°$ C. to $+30°$ C. Accordingly, the temperature which represents the operating point of the valve switching operation can also be freely established.

As discussed above, in the embodiment disclosed of the present invention, a valve body is formed of a magnetically soft, amorphous metal which characteristically changes to a paramagnetic material at or above a Curie point which represents the operating point. The valve body is magnetically coupled to a permanent magnet so as to be magnetically excited thereby. The excitement and the loss of excitement which occurs at temperatures at or above the Curie point permits a direct, reliable valve operation. In this manner, improved accuracy is achieved with a simple arrangement.

Obviously, numerous modifications and variations of the present invention are possible in light of the above teachings. It is therefore to be understood that within the scope of the appended claims, the invention may be practiced otherwise than as specifically described herein.

What is claimed as new and desired to be secured by Letters Patent of the United States is:

1. A temperature sensing valve comprising:
   a casing having an internal fluid passage member formed therein and forming a valve seat;
   a fixed permanent magnet mounted in said casing;
   a movable valve body which comprises a magnetically soft, amorphous metal member supported in a thermally sensitive region of said casing for movement between a first and second position engaging said seat and being disengaged from said seat, respectively, and being magnetically coupled to said permanent magnet so that flow through said fluid passage member can be interrupted in response to magnetic excitement of said valve body; and
   spring means for urging said valve body to permit fluid flow through said fluid passage member wherein when the temperature of said thermally sensitive region is below the Curie point of said valve body, said valve body is excited by said permanent magnet so as to maintain said fluid passage member closed against the biasing force of said spring means whereas when the temperature of said thermally sensitive region reaches the Curie point of said valve body, said valve body comprises a paramagnetic body and is no longer excited by said permanent magnet so as to be displaced by said biasing force of said spring means to said second position for flow of said fluid through said fluid passage member and wherein said spring means is located radially within said permanent magnet and said valve seat is located radially within said spring means.

2. A temperature sensing valve as set forth in claim 1 wherein said magnetically soft, amorphous metal member comprises a plurality of sheets of magnetically soft, amorphous metal members forming a stack located inside and adjacent to said thermally sensitive region.

3. A temperature sensing valve as set forth in claim 1 wherein said casing has a first port formed therein and further comprising a first valve seat mounted on said fluid passage member and operatively engagable with said valve member.

4. A temperature sensing valve as set forth in claim 1 wherein said magnetically soft, amorphous metal member comprises a plurality of sheets of magnetically soft amorphous metal members forming a stack located inside and adjacent said thermally sensitive region and wherein said casing has a first port formed therein and further comprising:
   a first valve seat mounted on said fluid passage member and operatively engagable with said valve member.

* * * * *